(12) United States Patent
Kamata et al.

(10) Patent No.: US 12,222,337 B2
(45) Date of Patent: Feb. 11, 2025

(54) LIQUID CHROMATOGRAPH

(71) Applicant: SHIMADZU CORPORATION, Kyoto (JP)

(72) Inventors: Etsuho Kamata, Kyoto (JP); Saki Yoshino, Kyoto (JP); Fuyuki Okamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 500 days.

(21) Appl. No.: 17/429,037

(22) PCT Filed: Feb. 19, 2019

(86) PCT No.: PCT/JP2019/005991
§ 371 (c)(1),
(2) Date: Aug. 6, 2021

(87) PCT Pub. No.: WO2020/170320
PCT Pub. Date: Aug. 27, 2020

(65) Prior Publication Data
US 2022/0137008 A1    May 5, 2022

(51) Int. Cl.
*G01N 30/28*    (2006.01)
*G01N 30/02*    (2006.01)
*G01N 30/32*    (2006.01)

(52) U.S. Cl.
CPC ....... *G01N 30/28* (2013.01); *G01N 2030/027* (2013.01); *G01N 2030/326* (2013.01); *G01N 2030/328* (2013.01)

(58) Field of Classification Search
CPC ........ G01N 30/26; G01N 30/28; G01N 30/30; G01N 2030/326; G01N 2030/328
See application file for complete search history.

(56) References Cited

U.S. PATENT DOCUMENTS

2013/0295597 A1* 11/2013 DeWitte ............... G01N 35/026
                                                                435/23
2015/0276688 A1   10/2015 Aoki

FOREIGN PATENT DOCUMENTS

JP    H09-072911 A    3/1997
JP    H11-122276 A    4/1999
(Continued)

OTHER PUBLICATIONS

Office Action for corresponding JP Application No. 2021-501171 dated Jun. 21, 2022, with English machine translation.
(Continued)

*Primary Examiner* — Nathaniel J Kolb
(74) *Attorney, Agent, or Firm* — Renner, Otto, Boisselle & Sklar, LLP (57) ABSTRACT

A liquid chromatograph includes: a liquid meter that measures a liquid amount of a mobile phase stored in one or more mobile phase containers; and a notification unit that notifies an operator of the liquid amount of the mobile phase in each of the one or more mobile phase containers measured by the liquid meter. According to such a liquid chromatograph, when the operator replenishes the mobile phase to the mobile phase container, it is not necessary to visually measure the liquid amount of the mobile phase or manually input the value to the control device, so that it is possible to reduce the workload of the operator regarding the liquid amount management of the mobile phase.

2 Claims, 6 Drawing Sheets

(56) References Cited

FOREIGN PATENT DOCUMENTS

| | | |
|---|---|---|
| JP | 2000-121620 A | 4/2000 |
| JP | 2007-040811 A | 2/2007 |
| JP | 2015-194434 A | 11/2015 |

OTHER PUBLICATIONS

Notice of Allowance for corresponding JP Application No. 2021-501171 dated Nov. 8, 2022, with English machine translation.
Office Action for corresponding CN Application No. 201980091887.0 dated Jun. 27, 2023, with English machine translation.
International Search Report for corresponding Application No. PCT/JP2019/005991, mailed Apr. 23, 2019.
Written Opinion for corresponding Application No. PCT/JP2019/005991, mailed Apr. 23, 2019.

* cited by examiner

LIQUID CHROMATOGRAPH

TECHNICAL FIELD

The present invention relates to a liquid chromatograph.

BACKGROUND ART

A liquid chromatograph includes a plurality of analysis units such as a pump, a column oven, a detector, and an autosampler. In recent years, in such a liquid chromatograph, a control device in which a predetermined control/processing program is installed in a personal computer is widely used in order to integrally control each analysis unit and process collected data. In such a control device, a batch table describing an execution order and an analysis condition of each analysis is created in advance for a plurality of analyses, and the control device controls the analysis units according to the batch table, so that the plurality of analyses can be performed in a series.

However, in conducting such a series of analyses, a large amount of mobile phase is consumed, so that there is a possibility that the mobile phase runs out on the way and the series of analyses is interrupted. Conventionally, in order to prevent such a situation from happening, there is a liquid chromatograph having a function of automatically calculating the remaining amount of the mobile phase, and notifying the analysis operator of the result (see, for example, Patent Document 1). In such a liquid chromatograph, while conducting a series of analyses, the cumulative supply amount of each mobile phase is calculated based on the flow rate of the pump or the like, and the remaining amount of each mobile phase is calculated by subtracting the cumulative amount from the total mobile phase amount set in advance by the operator. Since the calculated remaining amount is notified to the operator by being displayed on a monitor attached to the control device or the like, the operator can take an appropriate measure such as replenishing the mobile phase to the mobile phase container when the remaining amount decreases to some extent.

CITATION LIST

Patent Literature

Patent Literature 1: JP 2015-194434 A ([0003]-[0007])

SUMMARY OF INVENTION

Technical Problem

In the conventional liquid chromatograph, after replenishing the mobile phase to the mobile phase container, the operator measures the liquid amount in the mobile phase container by visually observing the liquid amount, and manually inputs the measured value as the total mobile phase amount to the control device. Such an operation needs to be performed every time the mobile phase is replenished, which requires extra workload and is troublesome.

The invention has been made in view of the above points, and an object of the invention is to reduce workload of the operator related to management of a residual amount of a mobile phase in a liquid chromatograph.

Solution to Problem

A first aspect of the invention relates to a liquid chromatograph including: a liquid meter configured to measure a liquid amount of a mobile phase stored in each of one or more mobile phase containers; and a notification unit configured to notify an operator of a liquid amount of a mobile phase in each of the one or more mobile phase containers measured by the liquid meter.

A second aspect of the invention relates to a liquid chromatograph including: a liquid meter configured to measure a liquid amount of a mobile phase stored in each of one or more mobile phase containers; one or more pumps each connected to one of the one or more mobile phase containers; a correspondence relationship storage unit configured to store, for each of the one or more pumps, an correspondence relationship between an identifier of the pump and an identifier of a mobile phase container connected to the pump among the one or more mobile phase containers; a batch table storage unit configured to store a batch table in which analysis conditions and an execution order are described for a plurality of analyses; a predicted cumulative amount calculation unit configured to calculate, based on the correspondence relationship and the batch table, for each of the one or more mobile phase containers, a predicted cumulative amount of mobile phase that will be used in the plurality of analyses; and a notification unit configured to notify an operator of a fact that a liquid amount of a mobile phase is below the predicted cumulative amount when the liquid amount of a mobile phase measured by the liquid meter is below the predicted cumulative amount for at least one of the one or more mobile phase containers.

A third aspect of the invention relates to a liquid chromatograph including: a liquid meter configured to measure a liquid amount of a mobile phase stored in each of one or more mobile phase containers; a threshold storage unit configured to store a threshold value of a liquid amount determined for each of the one or more mobile phase containers; a contact address storage unit configured to store contact address of an operator registered in advance; and a message sending unit configured to send, for at least one of the one or more mobile phase containers, a message indicating a fact that the liquid amount of the mobile phase measured by the liquid meter is below the threshold value to the contact address at a time point when the liquid amount has fallen below the threshold value.

A fourth aspect of the invention relates to a liquid chromatograph including: a liquid meter configured to measure a liquid amount of a mobile phase stored in each of one or more mobile phase containers; one or more pumps each connected to one of the one or more mobile phase containers; a correspondence relationship storage unit configured to store, for each of the one or more pumps, an correspondence relationship between an identifier of the pump and an identifier of a mobile phase container connected to the pump among the one or more mobile phase containers; a batch table storage unit configured to store a batch table in which analysis conditions and an execution order are described for a plurality of analyses; a predicted cumulative amount calculation unit configured to calculate, based on the correspondence relationship and the batch table, for each of the one or more mobile phase containers, a predicted cumulative amount of mobile phase that will be used in subsequent analyses during execution of an analysis according to the batch table; and a notification unit configured to notify an operator of a fact that a liquid amount of a mobile phase measured by the liquid meter is below the predicted cumulative amount for at least one of the one or more mobile phase containers at a time point when the liquid amount has fallen below the predicted cumulative amount.

Advantageous Effects of Invention

According to a liquid chromatograph of the invention, when an operator replenishes a mobile phase, it is not necessary to visually measure a liquid amount in a mobile phase container and manually input the value to a control device, so that it is possible to reduce the workload of the operator regarding the management of the remaining amount of the mobile phase in the liquid chromatograph.

DESCRIPTION OF EMBODIMENTS

First Embodiment

Hereinafter, a liquid chromatograph according to a first embodiment of the invention will be described with reference to FIGS. 1 and 2.

Figure 1:
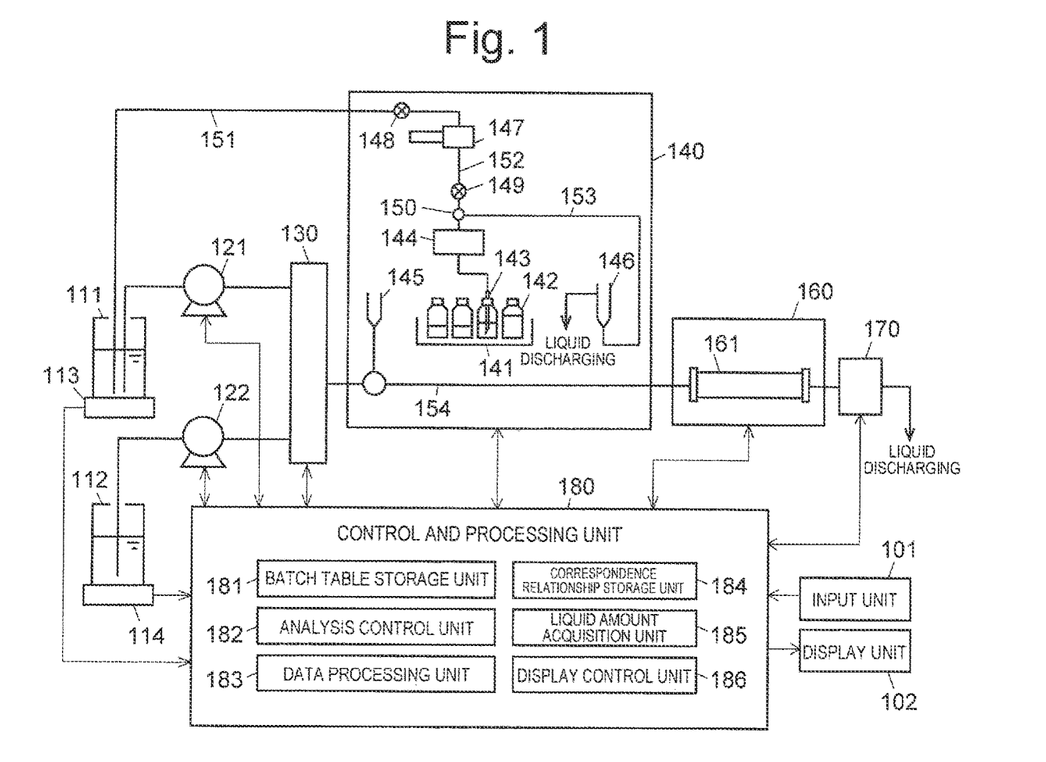
FIG. 1 is a schematic configuration diagram of a liquid chromatograph according to a first embodiment of the invention.

FIG. 1 is a schematic configuration diagram of a liquid chromatograph according to this embodiment. The liquid chromatograph includes a first liquid feeding pump 121 configured to suck a mobile phase A in a first mobile phase container 111, a second liquid feeding pump 122 configured to suck a mobile phase B in a second mobile phase container 112, a gradient mixer 130 configured to mix the mobile phase A and the mobile phase B, an autosampler 140 configured to automatically select and introduce one of a large number of liquid samples into the mobile phase A/B sent from the liquid feeding pumps 121 and 122 via the gradient mixer 130, a column oven 160 configured to adjust a temperature of a column 161, a detector 170 configured to detect a component eluted from the column 161, a control and processing unit 180 configured to control each unit described above and process data obtained by the detector 170, a first liquid meter 113 configured to measure the liquid amount of the mobile phase A in the first mobile phase container 111, and a second liquid meter 114 that measures the liquid amount of the mobile phase B in the second mobile phase container 112. Here, as the detector 170, for example, a mass spectrometer, an absorbance detector, or the like can be used.

The first liquid meter 113 and the second liquid meter 114, which are characteristic configurations of the liquid chromatograph according to this embodiment, are devices for measuring the amount of the mobile phase A in the first mobile phase container 111 and the amount of the mobile phase B in the second mobile phase container 112, respectively, and specifically, for example, the mass of each mobile phase can be measured by a scale.

The autosampler 140 includes a sampling needle (hereinafter simply referred to as a "needle") 143 for collecting a sample liquid from each vial (sample container) 142 placed on a sample rack 141, a moving mechanism 144, an injection port 145, a rinse port 146, and a measuring pump 147. The injection port 145 is connected to the middle of a flow path (hereinafter referred to as "mobile phase flow path") 154 of the mobile phase from the gradient mixer 130 to the column 161. The needle 143 is movable in the horizontal direction and the vertical direction by the moving mechanism 144, and can move on the injection port 145, the vial 142 and the rinse port 146 and can be inserted into each of them.

The measuring pump 147 includes two suction/discharge ports (not illustrated), and a flow path (hereinafter referred to as a "first rinse flow path") 151 leading to the first mobile phase container 111 is connected to one of the ports, and a flow path (hereinafter referred to as a "needle flow path") 152 leading to the needle 143 is connected to the other port. A first on-off valve 148 is provided on the first rinse flow path 151, and a second on-off valve 149 is provided on the needle flow path 152. On the needle flow path 152, a switching valve 150 is provided between the second on-off valve 149 and the needle 143, and a flow path (referred to as a "second rinse flow path") 153 leading to the rinse port 146 is connected via the switching valve 150. The switching valve 150 switches between a state in which the measuring pump 147 is connected to the needle 143 and a state in which the measuring pump 147 is connected to the rinse port 146.

In such an autosampler 140, the collection of the sample liquid from the vial 142 is performed by inserting the tip of the needle 143 into one of the vials 142, closing the first on-off valve 148, opening the second on-off valve 149, and sucking a predetermined amount of sample liquid into the measuring pump 147 by causing the measuring pump 147 to perform a suction operation in a state where the measuring pump 147 is connected to the needle 143 by the switching valve 150. In addition, the sample liquid is injected into the mobile phase flow path 154 by inserting the tip of the needle 143 into the injection port 145, closing the first on-off valve 148, opening the second on-off valve 149, and discharging the sample liquid in the measuring pump 147 by causing the measuring pump 147 to perform a discharging operation in a state where the measuring pump 147 is connected to the needle 143 by the switching valve 150.

After the collection and injection of the sample liquid as described above are completed, the needle 143 is washed (rinsed) in the following procedure. First, in a state where the first on-off valve 148 is opened and the second on-off valve 149 is closed, the measuring pump 147 is caused to perform a suction operation to suck the mobile phase A into the measuring pump 147. Subsequently, in a state where the first on-off valve 148 is closed, the second on-off valve 149 is opened, and the measuring pump 147 is connected to the rinse port 146 by the switching valve 150, the measuring pump 147 is operated to discharge the mobile phase A in the measuring pump 147. As a result, the inside of the rinse port 146 is filled with the mobile phase A, and the excess mobile phase A is discharged from the liquid discharge port provided at the upper portion of the rinse port 146. Next, the needle 143 is immersed in the mobile phase A stored in the rinse port 146, and the needle 143 is washed for a certain period of time. That is, here, the mobile phase A serves as a rinse liquid (cleaning liquid) for cleaning the needle 143. In the invention, the term "mobile phase" means not only a liquid used for separation of a sample component in the column 161 but also all liquids fed from the mobile phase containers 111 and 112 like the rinse liquid.

The control and processing unit 180 includes, as functional blocks, a correspondence relationship storage unit 184, a liquid amount acquisition unit 185, and a display control unit 186 (corresponding to a notification unit in the invention) that perform characteristic operations of the liquid chromatograph of this embodiment, in addition to a batch table storage unit 181 that stores a batch table describing analysis conditions and an execution order for a plurality of analyses, an analysis control unit 182 that controls each unit according to the description of the batch table to execute analysis of a sample, and a data processing unit 183 that generates a chromatogram that is an analysis result of the sample by performing predetermined processing on data obtained by the detector 170. An input unit 101 including a pointing device such as a mouse, a keyboard, or the like, and a display unit 102 including a liquid crystal display or the like are connected to the control and processing unit 180.

Note that the entity of the control and processing unit 180 is a computer such as a personal computer or a workstation, and functions by the functional blocks described above can be achieved by executing dedicated control/processing software installed in advance in the computer.

A general analysis operation in the liquid chromatograph of this embodiment will be briefly described. Under the control of the analysis control unit 182, the liquid feeding pumps 121 and 122 suck the mobile phases A and B at predetermined flow rates from the mobile phase containers 111 and 112, respectively, and feed the mobile phases A and B to the gradient mixer 130. The gradient mixer 130 mixes the mobile phases A and B and sends the mixture to the autosampler 140 at a constant flow rate. In the autosampler 140, one of the plurality of vials 142 is selected, a predetermined amount of sample liquid in the vial 142 is collected by the needle 143, and the needle is inserted into the injection port 145 to discharge the sample liquid, whereby the sample liquid is injected into the mobile phase. The sample liquid is introduced into the column 161 whose temperature is adjusted along the flow of the mobile phase, and components (sample components) in the sample liquid are separated when the sample liquid passes through the column 161. The eluate containing the sample component thus separated exits from the outlet of the column 161 and is introduced into the detector 170. The detector 170 outputs a detection signal corresponding to the amount of the sample component in the eluate. This signal is digitized by an AD converter (not illustrated) and input to the control and processing unit 180, and a chromatogram is created on the basis of the signal in the data processing unit 183.

Next, a characteristic operation of the liquid chromatograph according to this embodiment will be described. First, at the time of analysis, the operator inputs, from the input unit 101, a correspondence relationship between identifiers of the mobile phase containers 111 and 112 used for analysis and a pump (liquid feeding pumps 121 and 122 and measuring pump 147) that sucks the mobile phase from each of the mobile phase containers 111 and 112, and stores the correspondence relationship in the correspondence relationship storage unit 184. In the above example, since the mobile phase A in the first mobile phase container 111 is sucked by the first liquid feeding pump 121 and the measuring pump 147, the identifiers of the first mobile phase container 111, the first liquid feeding pump 121, and the measuring pump 147 are stored in association with each other. Further, since the mobile phase in the second mobile phase container 112 is sucked by the second liquid feeding pump 122, the identifiers of the second mobile phase container 112 and the second liquid feeding pump 122 are stored in association with each other. The identifiers of the mobile phase containers 111 and 112 may be, for example, character strings (for example, "container A", "container B", and the like) representing the mobile phase containers 111 and 112 themselves, or names (for example, "pure water", "acetonitrile", and the like) of liquids stored in the mobile phase containers 111 and 112. In addition, as the identifiers of the pumps 121, 122, and 147, for example, a character string ("mobile phase A pump", "mobile phase B pump", "rinse liquid pump", and the like) including the role of the liquid sent by the pumps 121, 122, and 147 can be used.

Thereafter, when the feeding of the mobile phase by at least one of the first liquid feeding pump 121 and the second liquid feeding pump 122 is started, the control and processing unit 180 confirms the liquid amount of the mobile phase in the first mobile phase container 111 and the second mobile phase container 112 at regular time intervals, and displays the liquid amount on the screen of the display unit 102. The operation at this time will be described with reference to the flowchart of FIG. 2.

Figure 2:
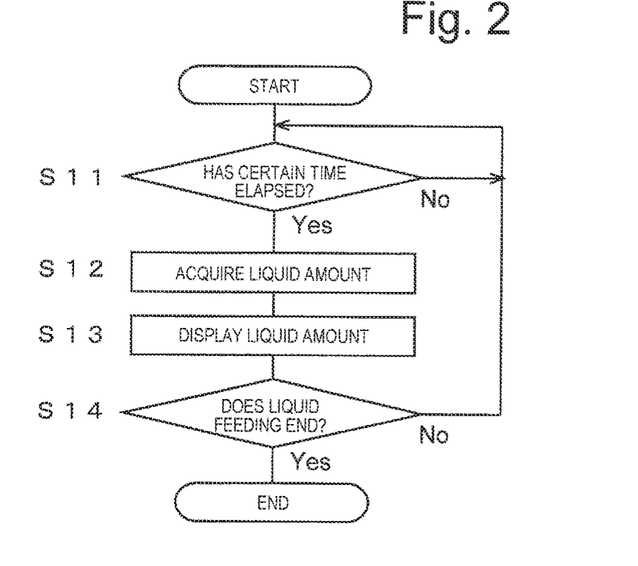
FIG. 2 is a flowchart illustrating a procedure of a process related to liquid amount management of a mobile phase in the embodiment.

First, the liquid amount acquisition unit 185 acquires measurement results from the first liquid meter 113 and the second liquid meter 114 at a point in time when a predetermined time has elapsed from the start of feeding the mobile phase (that is, a point in time when Yes is determined in Step S11 in FIG. 2), and obtains the liquid amount of the mobile phase in the first mobile phase container 111 and the second mobile phase container 112 based on the measurement results (Step S12). Specifically, the liquid amount (volume) of the mobile phase stored in each of the mobile phase containers 111 and 112 is calculated based on the mass of the mobile phase in each of the mobile phase containers 111 and 112 measured by each of the liquid meters 113 and 114 and the specific gravity of the mobile phase in each of the mobile phase containers 111 and 112 registered in advance. Subsequently, the display control unit 186 acquires information on the identifiers of the mobile phase containers 111 and 112 and the identifiers of the pumps 121, 122, and 147 associated therewith from the correspondence relationship storage unit 184, and displays the identifier of the container, the liquid amount of the mobile phase in the container, and the identifier of the pump associated with the container for each of the mobile phase containers 111 and 112 on the screen of the display unit 102 (Step S13). Thereafter, the processes of Step S12 and Step S13 are repeatedly executed every time a certain period of time elapses (that is, every time Yes is determined in Step S11 in FIG. 2), and a series of processes is ended at a point in time when all the analyses are completed and the liquid feeding by the first liquid feeding pump 121 and the second liquid feeding pump 122 is ended (that is, a point in time when Yes is determined in Step S14 in FIG. 2). Here, the confirmation and display of the liquid amount of the mobile phase are performed at regular time intervals, but instead, the confirmation and display of the liquid amount of the mobile phase may be performed every time the analysis of a predetermined number of times is completed.

According to the liquid chromatograph of this embodiment, the operator can confirm the liquid amount of the mobile phase displayed on the display unit 102 and replenish the mobile phase at the time point when the liquid amount decreases to some extent, so that it is possible to prevent the mobile phase from becoming insufficient during liquid delivery. In addition, according to the liquid chromatograph of this embodiment, since the liquid amount in the mobile phase container is directly measured by the liquid meters 113 and 114, it is not necessary for the operator to visually measure the liquid amount and manually input the value to the control device, so that it is possible to reduce the workload of the operator related to the liquid amount management of the mobile phase. In addition to the liquid amount of the mobile phase in each of the mobile phase containers 111 and 112, the correspondence relationship between the mobile phase containers 111 and 112 and the pumps 121, 122, and 147 is displayed, so that the operator can easily grasp which part of the liquid chromatograph the mobile phase to be used remains to what extent.

Second Embodiment

Figure 4:
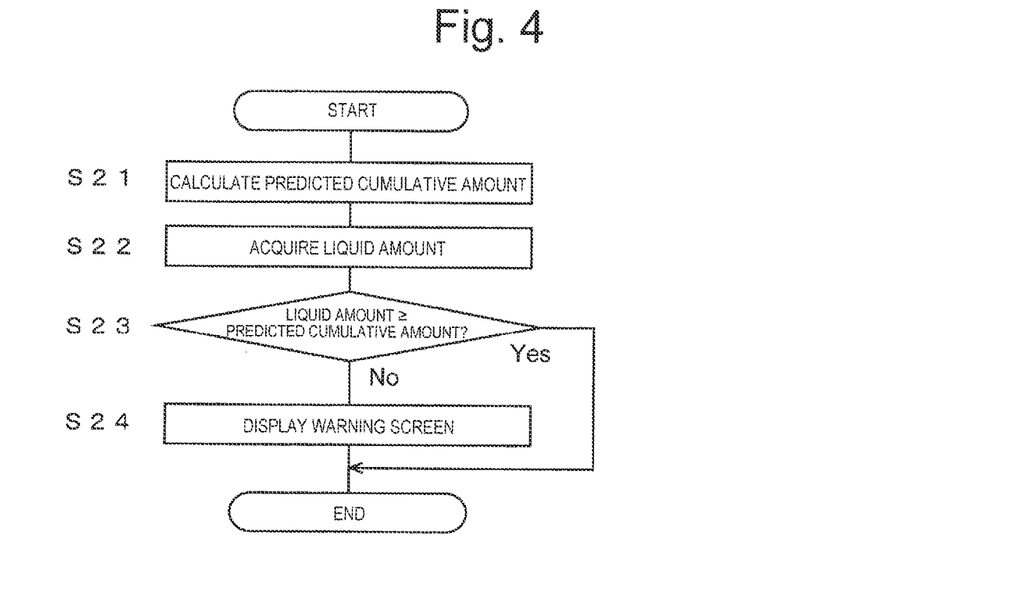
FIG. 4 is a flowchart illustrating a procedure of a process related to liquid amount management of a mobile phase in the embodiment.
Figure 5:
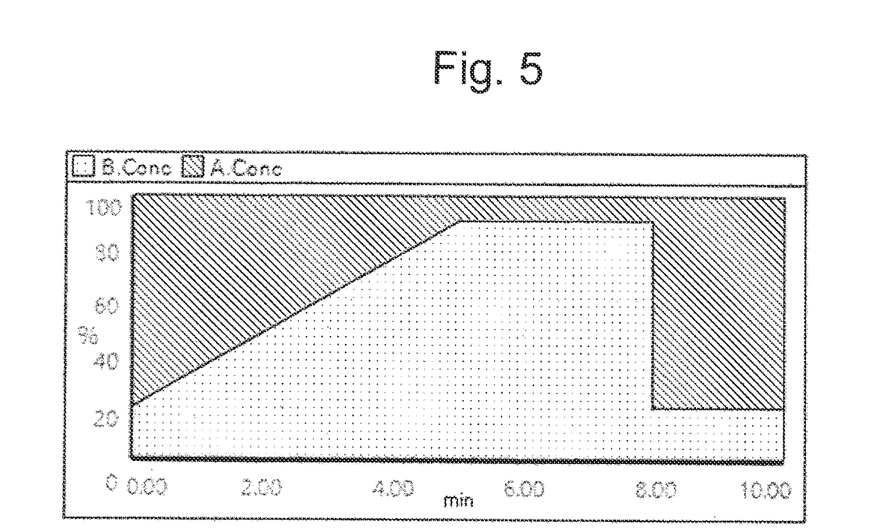
FIG. 5 is a diagram illustrating an example of a gradient profile.

Next, a liquid chromatograph according to a second embodiment of the invention will be described with reference to FIGS. 3 to 5.

Figure 3:
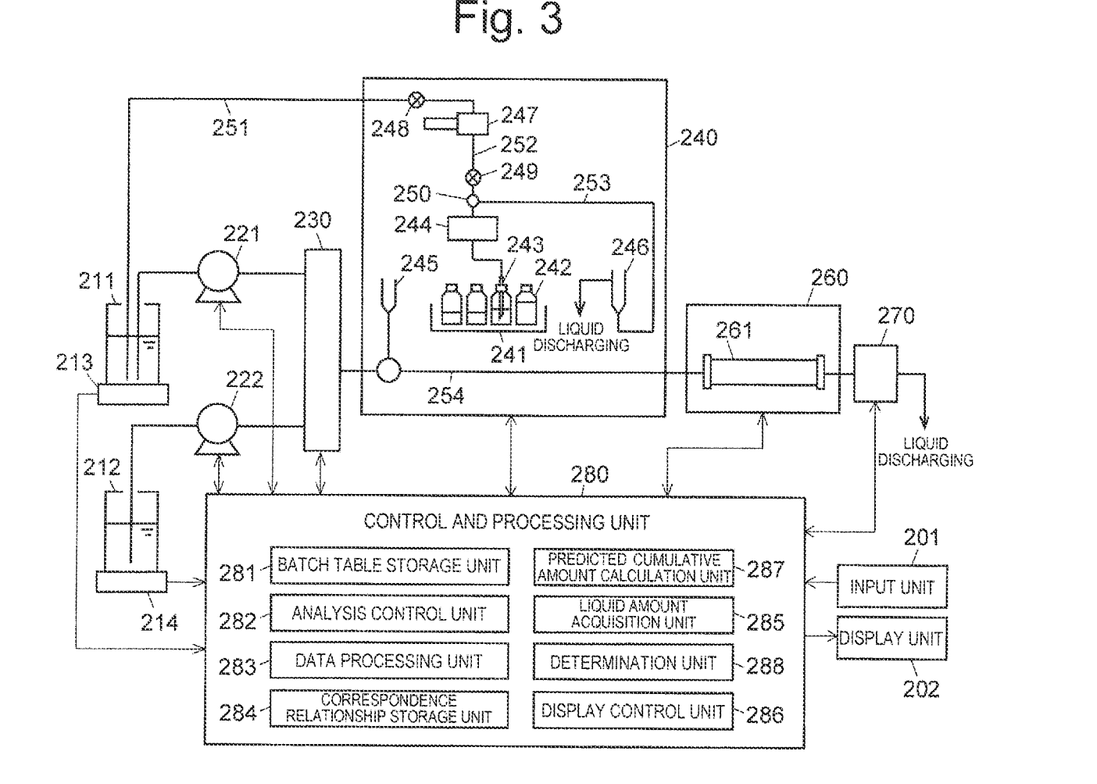
FIG. 3 is a schematic configuration diagram of a liquid chromatograph according to a second embodiment of the invention.

FIG. 3 is a schematic configuration diagram of the liquid chromatograph according to this embodiment. Note that the same or corresponding components as those illustrated in FIG. 1 are denoted by the same reference numerals in the last two digits, and the description of the component are appropriately omitted. In addition to functional blocks similar to those of the liquid chromatograph according to the first embodiment, a control and processing unit 280 in the liquid chromatograph according to this embodiment includes, as functional blocks, a predicted cumulative amount calculation unit 287 that calculates a predicted cumulative amount of each mobile phase in continuous analysis based on the batch table stored in a batch table storage unit 281, and a determination unit 288 that compares the predicted cumulative amount with the liquid amount of each mobile phase acquired by a liquid amount acquisition unit 285 and determines whether the liquid amount of the mobile phase is sufficient. Functions of these functional blocks are also realized by executing dedicated control and processing software installed in advance in a computer that is an entity of the control and processing unit 280 by the computer.

Next, a characteristic operation of the liquid chromatograph according to this embodiment will be described. In the analysis, as in the first embodiment, the correspondence relationship between the identifiers of the mobile phase containers 211 and 212 used for the analysis and the identifiers of the pumps 221, 222, and 247 that suck the mobile phase from the mobile phase containers 211 and 212 is stored in a correspondence relationship storage unit 284 by the operator.

Further, the operator operates an input unit 201 to create a batch table and stores the batch table in the batch table storage unit 281. In the batch table, one row corresponds to one sample analysis (that is, liquid chromatographic analysis associated with one sample injection by an autosampler 240), and each row describes, as information necessary for executing the analysis, a vial ID that is an identifier of a vial 242 containing the sample to be analyzed, a method file name applied to the analysis of the sample, and the like. Here, the method file (analysis condition file) is a file in which the contents of analysis, that is, various analysis conditions applied to the analysis are described, and is created in advance by the operator and stored in the control and processing unit 280. In this method file, the temperature of the column oven 260, the flow rates of the liquid feeding pumps 221 and 222, the gradient program, the operation at the time of sample injection in the autosampler 240, and the like are described as analysis conditions applied to each analysis. Note that, in the case of performing analysis (isocratic analysis) by an isocratic liquid feeding method in which a mobile phase is introduced into a column at a constant composition, the flow rate of a first liquid feeding pump 221 or a second liquid feeding pump 222 is described as one of the analysis conditions. In the case of performing analysis (gradient analysis) by a gradient liquid feeding method in which a plurality of mobile phases is introduced into a column 261 while a mixing ratio of the mobile phases is temporally changed, a gradient profile for instructing a temporal change in the flow rates of the first liquid feeding pump 221 and the second liquid feeding pump 222 is described as one of the analysis conditions.

Thereafter, when the operator operates the input unit 201 to designate the batch table and performs a predetermined operation (for example, an instruction to start analysis using the batch table, or the like), the control and processing unit 280 determines whether the continuous analysis described in the batch table can be executed to the end with the current liquid amount of the mobile phase. The operation of the control and processing unit 280 at this time will be described with reference to the flowchart of FIG. 4.

First, the predicted cumulative amount calculation unit 287 reads the batch table from the batch table storage unit 281 and calculates the total amount (predicted cumulative amount) of each mobile phase used in the continuous analysis described in the batch table (Step S21).

Specifically, first, the liquid feeding amount of each liquid feeding pump in the analysis defined in each row of the batch table is calculated. A specific example of the calculation at this time will be described below. Here, an example in which analysis by two-liquid mixing (binary gradient) is performed by two pumps of the first liquid feeding pump 221 (here, referred to as "pump A") and the second liquid feeding pump 222 (here, referred to as "pump B") will be described. Specific pump parameters are as follows:

Total analysis time: 10 (min)
Total flow rate: 5 (mL/min)
Initial concentration (pump A): 80(%)
Initial concentration (pump B): 20(%)
Gradient profile: (as shown in FIG. 5)

The total of the liquid feeding amounts of the pump A and the pump B in this analysis is [total flow rate]×[total analysis time]=5×10=50 (mL). Among them, the liquid feeding amount by the pump B corresponds to the shaded region with halftone dots in the gradient profile illustrated in FIG. 5. The area of the region is obtained from the sum of the areas of a trapezoid and a rectangle obtained by dividing the region at 5 (min) and 8 (min). That is, [liquid feeding amount of pump B]=[trapezoidal area of 0 to 5 min]+[rectangular area of 5 to 8 min]+[rectangular area of 8 to 10 min]=(5 [mL/min]×(20%+90%)/2×5 [min])+(5 [mL/min]×90%×3 [min])+(5 [mL/min]×20%×2 [min])=13.75+13.5+2.0=29.25 (mL). Similarly, since the liquid feeding amount by the pump A corresponds to the area of the shaded region of the gradient profile illustrated in FIG. 5, [liquid feeding amount of pump A]=[Total liquid feeding amount of pumps A and B]−[liquid feeding amount of pump B]=50−29.25=20.75 (mL).

After the liquid feeding amounts of the first liquid feeding pump 221 and the second liquid feeding pump 222 in each analysis defined in each row of the batch table are calculated as described above, the total liquid feeding amount of the first liquid feeding pump 221 and the total liquid feeding amount of the second liquid feeding pump 222 in the continuous analysis are obtained by summing these values for each of the pumps 221 and 222. Next, based on the information on the operation of the autosampler 240 described in the batch table, the total amount of the mobile phase fed by a measuring pump 247 in the continuous analysis, that is, the total amount of the rinse liquid consumed by the autosampler 240 is calculated. Then, the predicted cumulative amount of each mobile phase is specified from the total liquid feeding amount of each of the first liquid feeding pump 221, the second liquid feeding pump 222, and the measuring pump 247 obtained as described above and the correspondence relationship between each of the pumps 221, 222, and 247 and each of the mobile phase containers 211 and 212 stored in the correspondence relationship storage unit 284. For example, in the configuration illustrated in FIG. 2, since the mobile phase A in the first mobile phase container 211 is sucked by the first liquid feeding pump 221 and the measuring pump 247, the correspondence relationship storage unit 284 stores the identifier of the first mobile phase container 211 and the identifiers of the first liquid feeding pump 221 and the measuring pump 247 in association with each other. Therefore, the sum of the total liquid feeding amount of the first liquid feeding pump 221 and the total liquid feeding amount of the measuring pump 247 is the predicted cumulative amount of the mobile phase A.

After calculating the predicted cumulative amount of each mobile phase in the continuous analysis by the above Step S21, the liquid amount acquisition unit 285 acquires measurement results from the liquid meters 213 and 214, and obtains the liquid amount of each mobile phase based on the measurement results (Step S22). Since the details of the operation at this time are similar to those described in the first embodiment, the description thereof is omitted here.

Next, the determination unit 288 determines whether the liquid amount of the mobile phase obtained in Step S22 is equal to or more than the predicted cumulative amount calculated in Step S21 for each mobile phase container (Step S23). When the liquid amount of the mobile phase is equal to or more than the predicted cumulative amount for all the mobile phases (Yes in Step S23), the series of processes is terminated as it is.

On the other hand, when the liquid amount of the mobile phase is below the predicted cumulative amount in any one of the mobile phases (No in Step S23), the determination unit 288 further subtracts the liquid amount of the mobile phase from the predicted cumulative amount to calculate the insufficient amount of the mobile phase, and specifies up to which row in the batch table can be executed with the current liquid amount of the mobile phase. Then, the display control unit 286 displays a warning screen on the display unit 202 to notify the operator that the liquid amount of the mobile phase is insufficient (Step S24). In addition to the fact that the liquid amount of the mobile phase is insufficient, the warning screen displays the identifier of the mobile phase container storing the mobile phase having an insufficient liquid amount, the liquid amount of the mobile phase in each of the mobile phase containers 211 and 212, the insufficient amount of the mobile phase (that is, the liquid amount of the mobile phase to be replenished at the minimum), and what row of the batch table can be executed with the current liquid amount of the mobile phase.

The operator who has viewed the warning screen can take a measure such as replenishing an insufficient mobile phase to the mobile phase container or editing the batch table so as to execute analysis up to the number of rows that can be executed with the current liquid amount of the mobile phase, so that it is possible to prevent the mobile phase from becoming insufficient in the middle of the continuous analysis.

Modification of Second Embodiment

In the above description, it is determined whether the liquid amount of the mobile phase is sufficient before starting the continuous analysis according to the batch table, but instead, it may be determined whether the liquid amount of the mobile phase is sufficient for executing the subsequent analysis during the execution of the continuous analysis. The operation in this case is analyzed according to the flowchart of FIG. 6 (since the configuration of the liquid chromatograph is similar to that illustrated in FIG. 3, description thereof is omitted).

Figure 6:
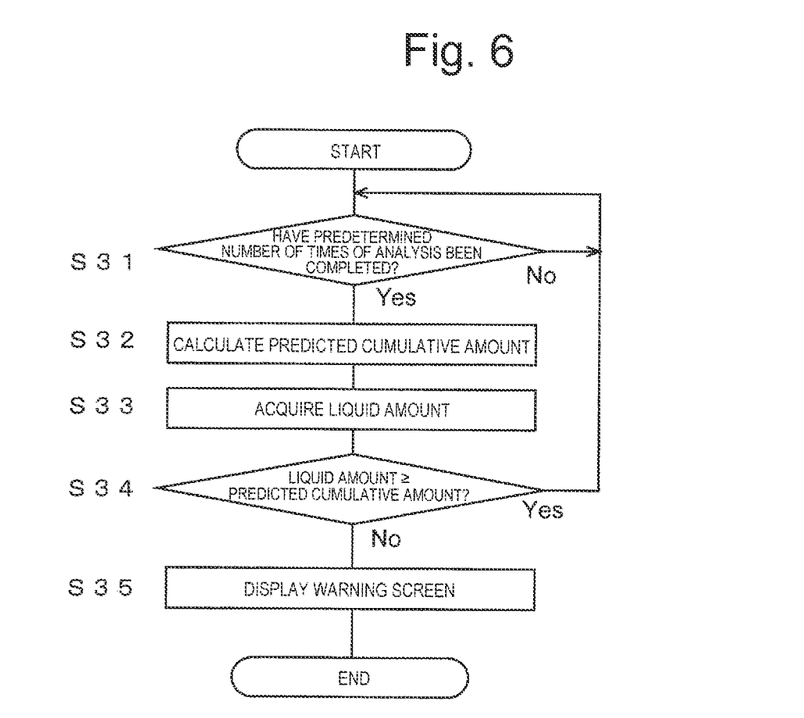
FIG. 6 is a flowchart illustrating another example of a process related to liquid amount management of a mobile phase in the embodiment.

First, during the execution of the continuous analysis according to the batch table, the predicted cumulative amount calculation unit 287 calculates the predicted cumulative amount of the mobile phase in the subsequent analysis (Step S32) at a time point when a predetermined number of analyses have been completed (Yes in Step S31). The method of calculating the predicted cumulative amount at this time is similar to that described above, but here, the total amount of the mobile phase consumed in the remaining analysis excluding the executed analysis among the plurality of analyses described in the batch table is calculated as the predicted cumulative amount. Subsequently, the liquid amount acquisition unit 285 acquires the liquid amount of the mobile phase in each of the mobile phase containers 211 and 212 (Step S33), and the determination unit 288 compares the liquid amount with the predicted cumulative amount for each mobile phase and determines whether the liquid amount is equal to or more than the predicted cumulative amount (Step S34). Here, when it is determined that the liquid amount is equal to or more than the predicted cumulative amount for the mobile phases in all the mobile phase containers 211 and 212 (Yes in Step S34), the process returns to Step S31, and Steps S31 to S34 are repeatedly executed. When it is determined in Step S34 that the liquid amount of the mobile phase stored in any one of the mobile phase containers 211 and 212 falls below the predicted cumulative amount (No in Step S34), the display control unit 286 causes the display unit 202 to display a warning screen to notify the operator that the liquid amount of the mobile phase is insufficient (Step S35). In addition to the fact that the liquid amount of the mobile phase is insufficient, the warning screen displays the identifier of the mobile phase container storing the mobile phase having an insufficient liquid amount, the liquid amount of the mobile phase in each of the mobile phase containers 211 and 212, the insufficient amount of the mobile phase (that is, the liquid amount of the mobile phase to be replenished at the minimum), and up to which row of the batch table can be executed with the current liquid amount of the mobile phase.

By determining whether the liquid amount of the mobile phase is insufficient at regular intervals during the execution of the continuous analysis in this manner, it is possible to appropriately manage the liquid amount of the mobile phase even if a larger amount of the mobile phase than the cumulative amount of the mobile phase predicted at the beginning of the continuous analysis is used in the actual analysis.

Third Embodiment

Next, a liquid chromatograph according to a third embodiment of the invention will be described with reference to FIGS. 7 and 8.

Figure 7:
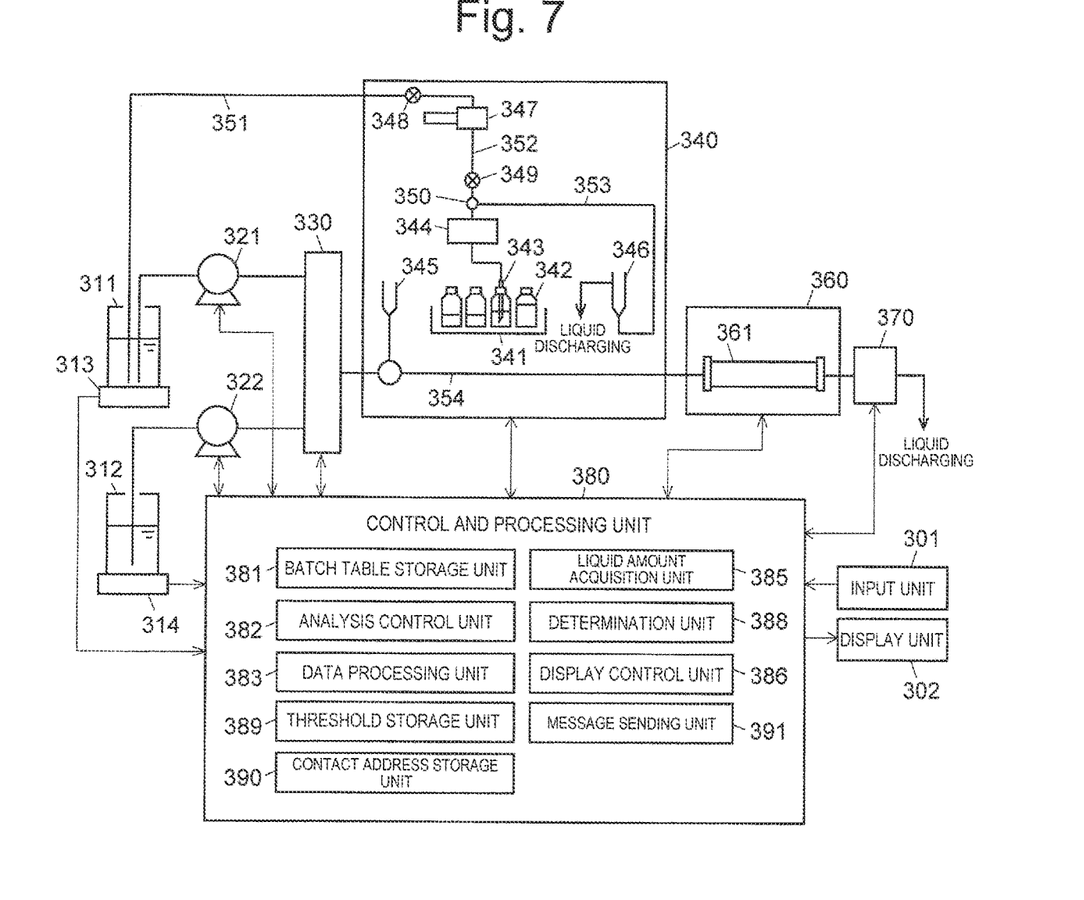
FIG. 7 is a schematic configuration diagram of a liquid chromatograph according to a third embodiment of the invention.

FIG. 7 is a schematic configuration diagram of the liquid chromatograph according to this embodiment. Note that the same or corresponding components as those illustrated in FIG. 1 are denoted by the same reference numerals in the last two digits, and the description of the components are appropriately omitted. In addition to the functional blocks (however, the correspondence relationship storage unit 184 is excluded) similar to those of the liquid chromatograph according to the first embodiment, a control and processing unit 380 in the liquid chromatograph according to this embodiment includes, as functional blocks, a threshold storage unit 389 that stores a threshold value of the liquid amount of the mobile phase, a determination unit 388 that determines whether the liquid amount of each mobile phase acquired by a liquid amount acquisition unit 385 is equal to or greater than the threshold value, a contact address storage unit 390 that stores a contact address registered in advance by the operator, and a message sending unit 391 that creates and sends a message addressed to the contact address. Functions of these functional blocks are also realized by executing dedicated control and processing software installed in advance in a computer that is an entity of the control and processing unit 380 by the computer.

First, in the analysis, the operator operates an input unit 301 to set a threshold value of the liquid amount of each mobile phase. Here, as the threshold value, a first threshold value and a second threshold value smaller than the first threshold value are set for each mobile phase (hereinafter, the first threshold value is referred to as a "warning threshold value", and the second threshold value is referred to as an "error threshold value").

Thereafter, when feeding of the mobile phase by a first liquid feeding pump 321 or a second liquid feeding pump 322 is started, the control and processing unit 380 compares the liquid amount of the mobile phase in a first mobile phase container 311 and a second mobile phase container 312 with the threshold values stored in the threshold storage unit 389 at regular time intervals. The operation at this time will be described with reference to the flowchart of FIG. 8.

Figure 8:
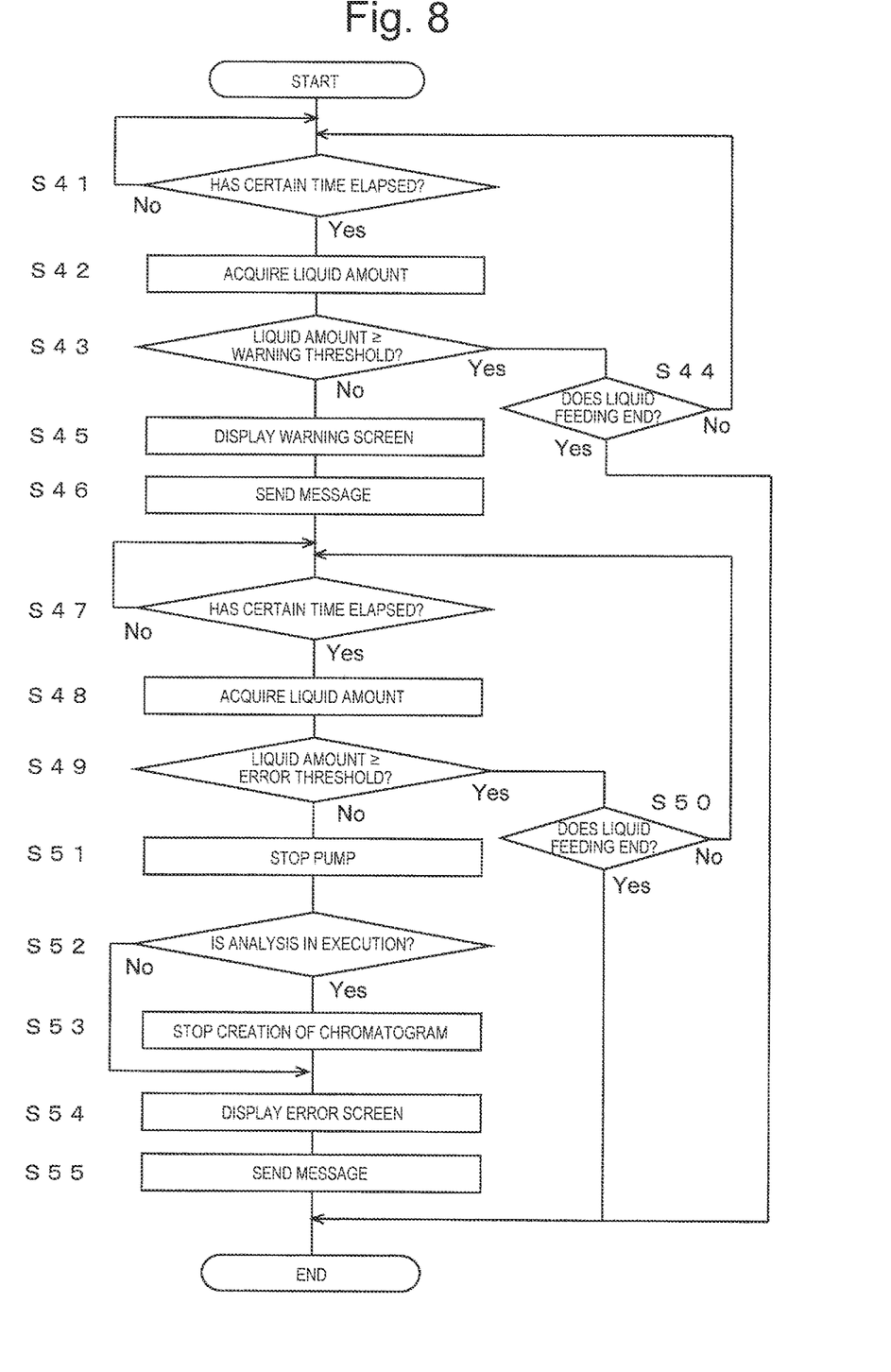
FIG. 8 is a flowchart illustrating a procedure of a process related to liquid amount management of a mobile phase in the embodiment.

First, the liquid amount acquisition unit 385 acquires measurement results from a first liquid meter 313 and a second liquid meter 314 at a point in time when a predetermined time has elapsed from the start of liquid feeding (that is, a point in time when Yes is determined in Step S41 in FIG. 8), and obtains the liquid amount of the mobile phase in the first mobile phase container 311 and the second mobile phase container 312 on the basis of the measurement results (Step S42). Subsequently, the determination unit 388 compares the warning threshold value stored in the threshold storage unit 389 with the liquid amount obtained in Step S42, and determines whether the liquid amount is the warning threshold value or more (Step S43). Here, when it is determined that the liquid amount is equal to or more than the warning threshold value for all the mobile phase containers 311 and 312 (Yes in Step S43), the process returns to Step S41, and Steps S42 and S43 are repeatedly executed at regular time intervals until the liquid amount falls below the warning threshold value (that is, until No in Step S43) or until the liquid feeding by the first liquid feeding pump 321 and the second liquid feeding pump 322 ends (that is, until Yes in Step S44).

On the other hand, when it is determined in Step S43 that the liquid amount falls below the warning threshold value in either one of the first mobile phase container 311 and the second mobile phase container 312 (No in Step S43), the display control unit 386 causes a display unit 302 to display a warning screen (Step S45), and the message sending unit 391 creates a message and sends the message to the contact address of the operator stored in the contact address storage unit 390 (Step S46). In the warning screen and the message, the fact that the liquid amount of the mobile phase falls below the warning threshold value and the identifier of the mobile phase container in which the liquid amount of the mobile phase falls below the warning threshold value are described. The processing in Steps S45 and S46 may be performed in the reverse order or may be performed simultaneously.

After the liquid amount of any of the mobile phases has fallen below the warning threshold value as described above, the liquid amounts of the mobile phases in the first mobile phase container 311 and the second mobile phase container 312 are acquired again at the time point when the predetermined time has elapsed (that is, the time point of Yes in Step S47) (Step S48), and it is determined whether the liquid amount is equal to or more than the error threshold value stored in the threshold storage unit 389 (Step S49). Here, when it is determined that the liquid amount is equal to or more than the error threshold value for all the mobile phase containers 311 and 312 (Yes in Step S49), the process returns to Step S47, and the processes in Steps S48 and S49 are repeatedly executed at constant time intervals until the liquid amount falls below the error threshold value (that is, until No in Step S49) or until all the analyses are completed and the liquid feeding by the first liquid feeding pump 321 and the second liquid feeding pump 322 is completed (that is, until Yes in Step S50).

On the other hand, when it is determined in Step S49 that the liquid amount of the mobile phase is below the error threshold value in either one of the first mobile phase container 311 and the second mobile phase container 312 (No in Step S49), an analysis control unit 382 stops feeding of the mobile phase by the first liquid feeding pump 321 and the second liquid feeding pump 322 (Step S51). That is, in this embodiment, the analysis control unit 382 corresponds to the pump stopping unit in the invention. When the sample is being analyzed (that is, when Yes in Step S52), the creation of the chromatogram in the data processing unit 383 is also stopped (Step S53). Further, the display control unit 386 displays an error screen on the display unit (Step S54), and the message sending unit 391 creates a message and sends the message to the contact address of the operator stored in the contact address storage unit 390 (Step S55). In the error screen and the message, the fact that the liquid amount of the mobile phase falls below the error threshold value and the identifier of the mobile phase container in which the liquid amount of the mobile phase falls below the error threshold value are described. Note that the processing in Steps S51 to S55 is not limited to the above, and may be performed in any order, and some steps may be performed simultaneously (however, Step S53 is always executed after Step S52).

According to the liquid chromatograph of this embodiment, when the liquid amount of the mobile phase falls below the first threshold value, a message notifying the fact is sent to a contact address registered in advance. Therefore, by setting, as the contact address, an e-mail address of a personal computer arranged in a place other than an analysis room in which the liquid chromatograph of this embodiment is arranged (for example, an office or the like), an e-mail address of a mobile terminal (for example, a mobile phone, a smartphone, a tablet PC, or the like) possessed by an operator, a telephone number, a terminal ID which is an identifier unique to the mobile terminal, or the like, it is possible to know that the liquid amount of the mobile phase has decreased even when the operator leaves the analysis room, and it is possible to take measures such as replenishing the mobile phase. The message can be created and sent in the form of, for example, a short message, a push notification, or the like in addition to an e-mail, but the form of the message is not limited thereto. Further, in the liquid chromatograph according to this embodiment, since the liquid feeding by the liquid feeding pump automatically stops when the liquid amount of the mobile phase falls below the second threshold value, it is possible to prevent the liquid feeding pumps 321 and 322 from being damaged by continuing operation of the liquid feeding pumps 321 and 322 in a state where the mobile phase in the mobile phase containers 311 and 312 disappears.

Fourth Embodiment

Next, a liquid chromatograph according to a fourth embodiment of the invention will be described with reference to FIGS. 9 and 10.

Figure 9:
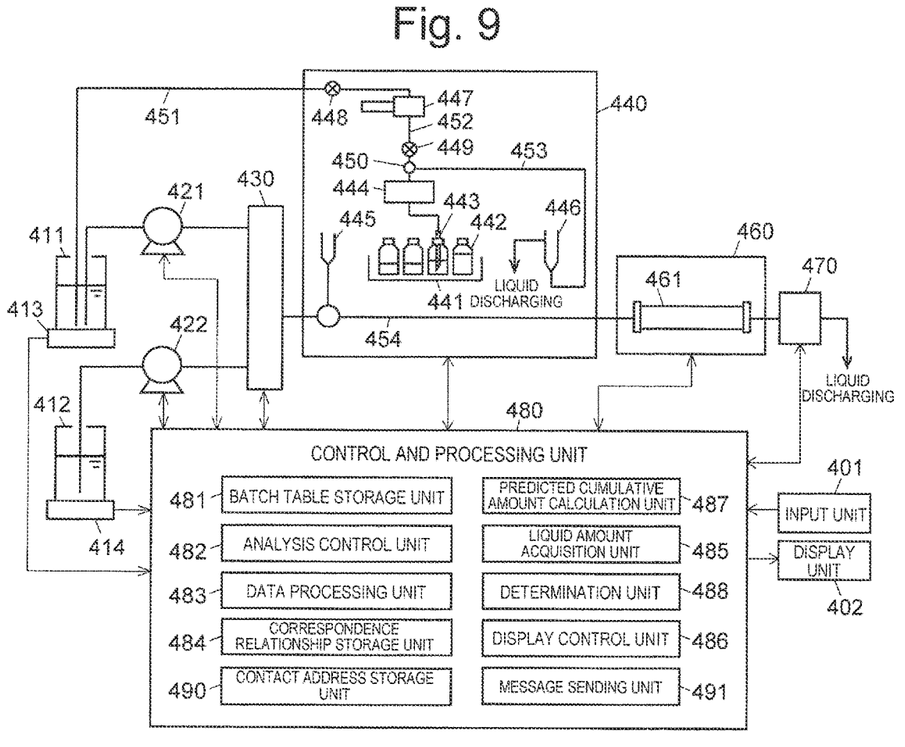
FIG. 9 is a schematic configuration diagram of a liquid chromatograph according to a fourth embodiment of the invention.

FIG. 9 is a schematic configuration diagram of a liquid chromatograph according to this embodiment. The same or corresponding components as those illustrated in FIG. 1 are denoted by the same reference numerals in the last two digits, and the description of the components are appropriately omitted. In addition to the functional blocks similar to those of the liquid chromatograph according to the first embodiment, a control and processing unit 480 in the chromatograph according to this embodiment includes, as functional blocks, a predicted cumulative amount calculation unit 487 that calculates a predicted cumulative amount of the mobile phase in subsequent analysis based on a description of a batch table during execution of continuous analysis stored in a batch table storage unit 481, a determination unit 488 that compares the predicted cumulative amount with a liquid amount of each mobile phase acquired by a liquid amount acquisition unit 485 and determines whether the liquid amount is sufficient to execute subsequent analysis, a contact address storage unit 490 that stores a contact address registered by an operator, and a message sending unit 491 that creates and sends a message addressed to the contact address. Functions of these functional blocks are also realized by executing dedicated control and processing software installed in advance in a computer that is an entity of the control and processing unit 480 by the computer.

Figure 10:
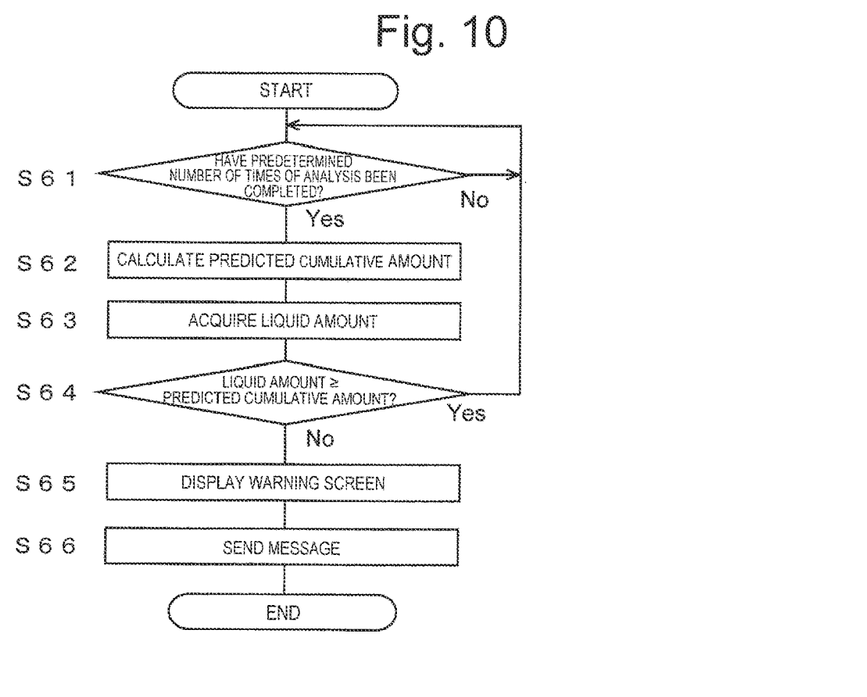
FIG. 10 is a flowchart illustrating a procedure of a process related to liquid amount management of a mobile phase in the embodiment.

The procedure of the process related to the liquid amount management of the mobile phase in this embodiment is analyzed according to the flowchart of FIG. 10. First, during the execution of the continuous analysis according to the batch table, the predicted cumulative amount calculation unit 487 calculates the predicted cumulative amount of each mobile phase in the subsequent analysis (Step S62) at a time point when a predetermined number of analyses have been completed (Yes in Step S61). The method of calculating the predicted cumulative amount at this time is similar to that in the second embodiment, but here, the total amount of the mobile phase consumed in the remaining analysis excluding the executed analysis among the plurality of analyses described in the batch table is calculated as the predicted cumulative amount. Subsequently, the liquid amount acquisition unit 485 acquires measurement results from a first liquid meter 413 and a second liquid meter 414, and obtains the liquid amount of the mobile phase in a first mobile phase container 411 and a second mobile phase container 412 (Step S63). Then, the determination unit 488 determines whether the liquid amount of each mobile phase is equal to or more than the predicted cumulative amount calculated in Step S62 (Step S64). In a case where it is determined in Step S64 that the liquid amount of the mobile phase is equal to or more than the predicted cumulative amount for all the mobile phase containers 311 and 312, the process returns to Step S61, waits for the end of the analysis of the predetermined number (that is, waits for Yes in Step S61), and executes Steps S62 and S63 again. On the other hand, when it is determined in Step S64 that the liquid amount of the mobile phase falls below the predicted cumulative amount in either one of the first mobile phase container 411 and the second mobile phase container 412, a display control unit 486 causes a display unit 402 to display a warning screen (Step S65), and the message sending unit 491 creates a message and sends the message to the contact address of the operator stored in the contact address storage unit 490 (Step S66). At this time, in the warning screen and the message, the fact that the mobile phase is insufficient, the identifier of the mobile phase container in which the liquid amount of the mobile phase is insufficient, and the insufficient amount are described. The insufficient amount is obtained by subtracting the liquid amount of the mobile phase acquired in Step S63 from the predicted cumulative amount calculated in Step S62. Here, Steps S65 and S66 may be performed in the reverse order, or may be performed simultaneously.

By determining whether the liquid amount of the mobile phase is insufficient at regular intervals during the execution of the continuous analysis in this manner, it is possible to appropriately manage the liquid amount of the mobile phase even if a larger amount of the mobile phase than the cumulative amount of the mobile phase predicted at the beginning of the continuous analysis is used in the actual analysis. When it is determined that the liquid amount is insufficient, a message notifying the fact is sent to a contact address registered in advance. Therefore, by registering, as the contact address, an e-mail address of a personal computer arranged in a place other than an analysis room in which the liquid chromatograph of this embodiment is arranged (for example, an office or the like), an e-mail address of a mobile terminal (for example, a mobile phone, a smartphone, a tablet PC, or the like) possessed by an operator, a telephone number, a terminal ID which is an identifier unique to the mobile terminal, or the like, it is possible to know that the liquid amount of the mobile phase has decreased even when the operator leaves the analysis room, and it is possible to take measures such as replenishing the mobile phase. Also in this embodiment, the message can be created and sent in the form of, for example, a short message, a push notification, or the like in addition to an e-mail, but the form of the message is not limited thereto.

Although the modes for carrying out the invention have been described above with reference to specific examples, the invention is not limited to the above-described embodiments, and modifications can be appropriately made within the scope of the gist of the invention. For example, in the first to fourth embodiments described above, two liquid feeding pumps and two mobile phase containers are provided, but the number of liquid feeding pumps and the number of mobile phases may be one or three or more, respectively. In addition, the liquid meter may be a scale, or may be, for example, a liquid level meter that measures the height of the liquid level of the mobile phase stored in the mobile phase container with a laser.

[Aspects]

It is understood by persons of ordinary skill in the art that the plurality of embodiments described above are specific examples of the following aspects.

A liquid chromatograph according to a first aspect of the invention is a liquid chromatograph that includes: a liquid meter configured to measure a liquid amount of a mobile phase stored in each of one or more mobile phase containers; and a notification unit configured to notify an operator of a liquid amount of a mobile phase in each of the one or more mobile phase containers measured by the liquid meter.

In the invention, the liquid meter means a device that directly measures the physical quantity (volume, weight, height of liquid level, and the like) of the mobile phase in the mobile phase container by a measuring instrument (a scale, a liquid level meter, or the like).

According to the liquid chromatograph of the first aspect, when the operator replenishes the mobile phase, it is not necessary to visually measure the liquid amount in the mobile phase container and manually input the value to the control device, so that it is possible to reduce the workload of the operator regarding the liquid amount management of the mobile phase in the liquid chromatograph.

A second aspect of the invention is the liquid chromatograph according to the first aspect further includes: one or more pumps each connected to one of the one or more mobile phase containers; and a correspondence relationship storage unit configured to store, for each of the one or more pumps, an identifier of the pump and an identifier of a mobile phase container connected to the pump among the one or more mobile phase containers in association with each other. The notification unit notifies an operator of the identifier of the pump stored in the correspondence relationship storage unit in association with the identifier of the mobile phase container, in addition to a liquid amount of a mobile phase in each of the one or more mobile phase containers measured by the liquid meter.

According to the liquid chromatograph of the second aspect, since the correspondence relationship between the mobile phase container and the pump is displayed in addition to the liquid amount of the mobile phase in the mobile phase container, the operator can easily grasp which part in the liquid chromatograph the mobile phase to be used remains to what extent.

A liquid chromatograph according to a third aspect of the invention includes: a liquid meter configured to measure a liquid amount of a mobile phase stored in each of one or more mobile phase containers; one or more pumps each connected to one of the one or more mobile phase containers; a correspondence relationship storage unit configured to store, for each of the one or more pumps, an correspondence relationship between an identifier of the pump and an identifier of a mobile phase container connected to the pump among the one or more mobile phase containers; a batch table storage unit configured to store a batch table in which analysis conditions and an execution order are described for a plurality of analyses; a predicted cumulative amount calculation unit configured to calculate, based on the correspondence relationship and the batch table, for each of the one or more mobile phase containers, a predicted cumulative amount of mobile phase that will be used in the plurality of analyses; and a notification unit configured to notify an operator of a fact that a liquid amount of a mobile phase is below the predicted cumulative amount when the liquid amount of a mobile phase measured by the liquid meter is below the predicted cumulative amount for at least one of the one or more mobile phase containers.

According to the liquid chromatograph of the third aspect, it is possible to know whether the liquid amount of the mobile phase is sufficient before starting the continuous analysis along the batch table, and it is possible to take measures such as replenishing the insufficient mobile phase to the mobile phase container.

A fourth aspect of the invention is the liquid chromatograph according to the third aspect, wherein, in a case where the liquid amount of the mobile phase measured by the liquid meter is below the predicted cumulative amount for at least one of the one or more mobile phase containers, the notification unit notifies up to which analysis among the plurality of analyses can be executed in addition to a fact that the liquid amount of the mobile phase measured by the liquid meter is below the predicted cumulative amount.

According to the liquid chromatograph of the fourth aspect, when the liquid amount of the mobile phase is insufficient, it is possible to cope with editing the batch table so as to execute analysis up to the number of rows that can be executed with the current liquid amount of the mobile phase.

A liquid chromatograph according to a fifth aspect of the invention includes: a liquid meter configured to measure a liquid amount of a mobile phase stored in each of one or more mobile phase containers; a threshold storage unit configured to store a threshold value of a liquid amount determined for each of the one or more mobile phase containers; a contact address storage unit configured to store contact address of an operator registered in advance; and a message sending unit configured to send, for at least one of the one or more mobile phase containers, a message indicating a fact that the liquid amount of the mobile phase measured by the liquid meter is below the threshold value to the contact address at a time point when the liquid amount has fallen below the threshold value.

According to the liquid chromatograph of the fifth aspect, when the liquid amount of the mobile phase has fallen below the threshold value, the message notifying the fact is sent to the contact address of the operator registered in advance. Therefore, even when the operator leaves the analysis room, it is possible to know that the liquid amount of the mobile phase has decreased.

A sixth aspect of the invention is the liquid chromatograph according to the fifth aspect, wherein, the threshold storage unit stores a first threshold value and a second threshold value smaller than the first threshold value as the threshold value, and the message sending unit sends the message to the contact address at a time point when a liquid amount of a mobile phase measured by the liquid meter falls below the first threshold value for at least one of the one or more mobile phase containers. The liquid chromatograph further includes: a pump stopping unit for stopping all the one or more pumps at a time point when the liquid amount of the mobile phase measured by the liquid meter has fallen below the second threshold value for at least one of the one or more mobile phase containers.

According to the liquid chromatograph of the sixth aspect, when the liquid amount of the mobile phase has fallen below the first threshold value, the message indicating the fact is sent to the contact address of the operator. Therefore, even when the operator leaves the analysis room, it is possible to know that the liquid amount of the mobile phase has decreased. Further, since the liquid feeding by the liquid feeding pump automatically stops when the liquid amount of the mobile phase falls below the second threshold value, it is possible to prevent the pump from being damaged by continuing operation of the pump in a state where the mobile phase in the mobile phase container disappears.

A liquid chromatograph according to a seventh aspect of the invention includes: a liquid meter configured to measure a liquid amount of a mobile phase stored in each of one or more mobile phase containers; one or more pumps each connected to one of the one or more mobile phase containers; a correspondence relationship storage unit configured to store, for each of the one or more pumps, an correspondence relationship between an identifier of the pump and an identifier of a mobile phase container connected to the pump among the one or more mobile phase containers; a batch table storage unit configured to store a batch table in which analysis conditions and an execution order are described for a plurality of analyses; a predicted cumulative amount calculation unit configured to calculate, based on the correspondence relationship and the batch table, for each of the one or more mobile phase containers, a predicted cumulative amount of mobile phase that will be used in subsequent analyses during execution of an analysis according to the batch table; and a notification unit configured to notify an operator of a fact that a liquid amount of a mobile phase measured by the liquid meter is below the predicted cumulative amount for at least one of the one or more mobile phase containers at a time point when the liquid amount has fallen below the predicted cumulative amount.

According to the liquid chromatograph of the seventh aspect, since it is determined whether the liquid amount of the mobile phase is insufficient at regular intervals during the execution of the continuous analysis along the batch table, even if a larger amount of the mobile phase than the cumulative amount of the mobile phase predicted at the beginning of the continuous analysis is used in the actual analysis, the liquid amount of the mobile phase can be appropriately managed.

An eighth aspect of the invention is the liquid chromatograph according to the seventh aspect, further includes: a contact address storage unit configured to store a contact address of an operator registered in advance; and a message sending unit configured to send, for at least one of the one or more mobile phase containers, a message indicating a fact that the liquid amount of the mobile phase measured by the liquid meter is below the predicted cumulative amount to the contact address at a time point when the liquid amount has fallen below the predicted cumulative amount.

The liquid chromatograph according to the eighth aspect can further recognize that the liquid amount of the mobile phase is decreased even when the operator leaves the analysis chamber.

REFERENCE SIGNS LIST

102 . . . Display Unit
111 . . . First Mobile Phase Container
112 . . . Second Mobile Phase Container
113 . . . First Liquid Meter
114 . . . Second Liquid Meter
121 . . . First Liquid Feeding Pump
122 . . . Second Liquid Feeding Pump
140 . . . Autosampler
147 . . . Measuring Pump
160 . . . Column Oven
161 . . . Column
170 . . . Detector
180 . . . Control And Processing Unit
181 . . . Batch Table Storage Unit
182 . . . Analysis Control Unit
183 . . . Data Processing Unit
184 . . . Correspondence Relationship Storage Unit
185 . . . Liquid Amount Acquisition Unit
186 . . . Display Control Unit

The invention claimed is:

1. A liquid chromatograph comprising:
one or more mobile phase containers each having a respective liquid meter;
one or more pumps each connected to one of the one or more mobile phase containers;
a correspondence relationship storage unit configured to store, for each of the one or more pumps, a correspondence relationship between an identifier of the pump and an identifier of a mobile phase container connected to the pump among the one or more mobile phase containers;
a batch table storage unit configured to store a batch table in which a set of analyses and an order for executing the analyses are defined, the set of analyses including analysis conditions, each of the analysis conditions including information regarding which mobile phase and a pump are to be used therein;
a predicted cumulative amount calculation unit configured to calculate, based on the correspondence relationship and the batch table, for each of the one or more mobile phase containers, a predicted cumulative amount of mobile phase that will be used in the set of analyses; and
a notification unit configured to notify an operator of a fact that a liquid amount of a mobile phase is below the predicted cumulative amount when the liquid amount of a mobile phase measured by the liquid meter is below the predicted cumulative amount for at least one of the one or more mobile phase containers,
wherein, in a case where the liquid amount of the mobile phase measured by the liquid meter is below the predicted cumulative amount for at least one of the one or more mobile phase containers, the notification unit notifies up to which analysis among the set of analyses can be executed in addition to a fact that the liquid amount of the mobile phase measured by the liquid meter is below the predicted cumulative amount.

2. The liquid chromatograph according to claim 1, wherein the notification unit notifies an operator of a combination of a fact that the liquid amount of the mobile phase measured by the liquid meter is below the predicted cumulative amount and the identifier of the pump stored in the correspondence relationship storage unit in association with the identifier of the mobile phase container.

* * * * *